US007206862B2

(12) United States Patent
Wheeler (10) Patent No.: US 7,206,862 B2
(45) Date of Patent: Apr. 17, 2007

(54) METHOD AND APPARATUS FOR EFFICIENTLY MATCHING RESPONSES TO REQUESTS PREVIOUSLY PASSED BY A NETWORK NODE

(75) Inventor: Graham A. Wheeler, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 692 days.

(21) Appl. No.: 10/128,919

(22) Filed: Apr. 24, 2002

(65) Prior Publication Data

US 2003/0204626 A1     Oct. 30, 2003

(51) Int. Cl.
*G06F 15/16* (2006.01)
(52) U.S. Cl. ........................ 709/245; 709/217
(58) Field of Classification Search ........... 709/245, 709/203, 217, 218, 219
See application file for complete search history.

(56) References Cited

U.S. PATENT DOCUMENTS

| | | | | |
|---|---|---|---|---|
| 5,519,706 A | * | 5/1996 | Bantz et al. | 455/435.2 |
| 5,764,890 A | * | 6/1998 | Glasser et al. | 726/11 |
| 5,784,362 A | * | 7/1998 | Turina | 371/321 |
| 5,926,549 A | * | 7/1999 | Pinkas | 713/168 |
| 5,987,376 A | * | 11/1999 | Olson et al. | 701/201 |
| 6,085,249 A | * | 7/2000 | Wang et al. | 709/229 |
| 6,115,376 A | * | 9/2000 | Sherer et al. | 370/389 |
| 6,219,706 B1 | * | 4/2001 | Fan et al. | 709/225 |
| 6,263,445 B1 | * | 7/2001 | Blumenau | 726/2 |
| 6,289,013 B1 | * | 9/2001 | Lakshman et al. | 370/389 |
| 6,385,209 B1 | * | 5/2002 | Skirmont et al. | 370/419 |
| 6,434,618 B1 | * | 8/2002 | Cohen et al. | 709/228 |
| 6,665,714 B1 | * | 12/2003 | Blumenau et al. | 709/222 |
| 6,738,828 B1 | * | 5/2004 | Keats et al. | 709/245 |

(Continued)

OTHER PUBLICATIONS

Cheung et al., *Proceedings of the International Conference on Dependable Systems and Networks 2000 (DSN 2000)*, New York, NY, Jun. 25-28, 2000, pp. 641-651 (IEEE Computing Society, Jun. 25, 2000).

(Continued)

*Primary Examiner*—Beatriz Prieto
*Assistant Examiner*—Michael D. Meucci
(74) *Attorney, Agent, or Firm*—Marshall, Gerstein & Borun LLP (57) ABSTRACT

A method and system are disclosed for efficiently matching incoming packets to previously forwarded outgoing packets within a network node to ensure a response received by a network node corresponds to a previously forwarded request. The network node receives an outgoing packet including state information and computes a mapping (e.g., hash) function value based upon the state information. Thereafter, the network node sets and entry within a bitmap at a position corresponding to the mapping function value. The network node also receives an incoming packet purportedly responsive to an earlier outgoing packet and includes state information of a type corresponding to the state information of an outgoing packet. The network node computes a mapping function value based upon the state information in the incoming packet. The network node then tests an entry corresponding to the mapping function value within one or more bitmaps including bits set at positions corresponding to previously forwarded outgoing packets. If the corresponding bit is not set within at least one of the bitmaps, then the network node discards the corresponding packet. Finally, in order to maintain a relative sparse bitmap, the entries are reset after detecting a clearance threshold event.

36 Claims, 5 Drawing Sheets

U.S. PATENT DOCUMENTS

| | | | |
|---|---|---|---|
| 6,778,501 B1* | 8/2004 | Malmgren et al. | 370/236 |
| 6,970,939 B2* | 11/2005 | Sim | 709/236 |
| 6,970,960 B1* | 11/2005 | Sarfati | 710/106 |
| 6,978,384 B1* | 12/2005 | Milliken | 709/227 |
| 7,000,021 B1* | 2/2006 | Radhakrishnan et al. | 709/230 |
| 7,003,574 B1* | 2/2006 | Bahl | 709/228 |
| 7,031,288 B2* | 4/2006 | Ogier | 370/338 |
| 7,047,287 B2* | 5/2006 | Sim et al. | 709/221 |
| 7,058,789 B2* | 6/2006 | Henderson et al. | 711/220 |
| 2002/0078174 A1* | 6/2002 | Sim et al. | 709/219 |
| 2002/0129165 A1* | 9/2002 | Dingsor et al. | 709/246 |
| 2002/0143944 A1* | 10/2002 | Traversat et al. | 709/225 |
| 2002/0143989 A1* | 10/2002 | Huitema et al. | 709/243 |

OTHER PUBLICATIONS

Frantzen et al., *Computers & Security*, 20 (3), 263-270 (May 1, 2001).

Tripunitara et al., *Proceedings of the 15th Annual Computer Security Applications Conference (ACSAC '99)*, Phoenix, AZ, Dec. 6-10, 1999, pp. 303-309 (IEEE Computing Society, Dec. 6, 1999).

Adam Langley, *The Freenet Protocol*, The Free Network Project, at http://freenet.sourceforge.net/index.php?page=protocol (last visited May 21, 2001).

Philip J. Erdelsky, *The Birthday Paradox*, EFG, at http://www.efgh.com/math/birthday.htm (last visited Mar. 8, 2002).

*Red-Black Tree*, National Institute of Standards and Technology, at http://www.nist.gov/dads/HTML/redblack.html (last visited Mar. 5, 2002).

Lai, Kevin, and Mary Baker, *Measuring Link Bandwidths Using a Deterministic Model of Packet Delay*, at Department of Computer Science at Stanford University, 13 pages.

Rowstron, Antony, and Peter Druschel, *Pastry: Scalable, distributed object location and routing for large-scale peer-to-peer systems*, at Microsoft Research, Ltd., St. George House and Rice University, 20 pages.

Druschel, Peter, and Antony Rowstron, *PAST: A large-scale, persistent peer-to-peer storage utility*, at Rice University and Microsoft Research, 6 pages.

Rowstron, Antony, and Peter Druschel, *Storage management and caching in PAST, a large-scale, persistent peer-to-peer storage utility*, at Microsoft Research, Ltd., St. George House and Rice University, 14 pages.

Rowstron, Antony, Anne-Marie Kermarrec, Peter Druschel, and Miguel Castro, *SCRIBE: The design of a large-scale event notification infrastructure*, at Microsoft Research, Ltd., St. George House and Rice University, 20 pages.

Dabek, Frank, Emma Brunskill, M.Frans Kaashoek, David Karger, Robert Morris, Ion Stoica, and Hari Balakrishnan, *Building Peer-to-Peer Systems With Chord, a Distributed Lookup Service*, at MIT Laboratory for Computer Science, 6 pages, at http://pdos.lcs.mit.edu/chord.

Ellison, C., *SPKI Requirements*, (The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).

\* cited by examiner

METHOD AND APPARATUS FOR EFFICIENTLY MATCHING RESPONSES TO REQUESTS PREVIOUSLY PASSED BY A NETWORK NODE

FIELD OF THE INVENTION

This invention generally relates to the area of computer systems. More particularly, the present invention concerns distributed networks, and methods and systems for enabling network nodes to identify and discard improper packet transmissions in a network including a potentially large number of pending network requests between a large number of requesters and respondents.

BACKGROUND OF THE INVENTION

There exists a general need in implementing network protocols to recognize and reduce the harmful effects of unauthorized (bogus, erroneous, corrupted) messages transmitted on a network. Such messages have been handled in the past by, for example, firewalls that store state information relating to requests and block responses and/or other messages from a network that are inconsistent with the state information.

It is also noted that many networks incorporate communication protocols wherein network nodes propagate messages between a requesting node and a respondent node. In such networks, the requesting node issues a request message that is received and then forwarded by one or more nodes within the network. The network nodes pass the request to one or more other nodes until the request reaches the respondent node. The respondent node thereafter formulates and transmits a response to the requesting node via one or more intermediate nodes.

Intermediate nodes vary in their degree of participation in network protocols. Some merely route requests, without applying any intelligence. However, in certain types of networks (e.g., peer-to-peer) it is desirable for such intermediate nodes to filter/read information conveyed within the packets that pass through the nodes and incorporate information contained within the packets into their data stores. An example of a protocol executed on networks that generally employ intermediate nodes to pass requests to a networked respondent node, and wherein the intermediate nodes incorporate selected information within certain forwarded packets (e.g., name resolution responses) is the Peer-to-peer Name Resolution Protocol (PNRP).

PNRP facilitates resolving a unique, 256-bit PRNP identification embedded within a request to particular Internet Protocol (IP) address and port contained in a response packet passed back to the originator of a request. PNRP does not utilize a centralized authority, but rather relies upon multiple, de-centralized name resolution authorities to provide IP address responses to PNRP requests. An originator of a request passes a name (ID) resolution request to one or more intermediate nodes that, in turn propagate the request (embedded within an outgoing packet) to a name resolution facility. One of potentially many name resolution facilities on the network determines a corresponding IP address and port. The corresponding IP address and port are placed within a response message (embedded within an incoming packet) that is returned to the originator of the request via potentially one or more of the "listening" intermediate nodes. In accordance with PNRP, network entities (including clients on intermediate nodes) are permitted to listen for published name/address pairing information transmissions (e.g., naming responses) on the network. Such name/address information proliferation increases the likelihood of successfully locating a named entity's address/port at some later time. In particular, in a PNRP environment, network clients acquire address knowledge by reading name resolution responses received by a node containing the network client. Since there is no centralized authority, it is important for the nodes to maintain accurate name/address information.

However, the network name/address knowledge acquisition method described above for a peer-to-peer network name resolution environment exposes listening clients on the network nodes to contamination of their name/address resolution information by network entities that publish name resolution responses containing false/inaccurate address information. Such false information is then stored within the name resolution data storage space of listening network clients when such clients update their name/address information in accordance with the unsolicited/false naming responses. Such vulnerability to false responses presents a high degree of risk to networks that allow building a name resolution cache on an intermediate node by listening to naming response packets.

It is known for firewalls and other packet-filtering mechanisms to examine state information when a packet is initially transmitted. In addition to determining whether to block transmission of the packet, the packet-filtering mechanisms maintain the state information for purposes of processing subsequent responses to ensure that they are authorized. Packet filtering using state information of course presents a cost to the computing node implementing such measures. In particular, generating, storing and removing state information becomes costly and a potentially significant burden upon the systems resources when thousands of such states are simultaneously maintained by a network node.

SUMMARY OF THE INVENTION

The present invention comprises a method and system for efficiently matching incoming packets to previously forwarded outgoing packets within a network node. The method and apparatus disclosed herein ensure that a response message received by a network node corresponds to a previously forwarded request message. The network node, including a mapping (e.g., hash) function receives an outgoing packet including state information. The network node computes a mapping function value based upon the state information. Thereafter, the network node sets an entry within a bitmap at a position corresponding to the value. The network node also receives an incoming packet purportedly responsive to an earlier outgoing packet. The incoming packet includes state information of a type corresponding to the state information of an outgoing packet. The network node computes a mapping function value based upon the state information in the incoming packet. The network node then tests an entry corresponding to the mapping function value within one or more bitmaps including bits set at positions corresponding to previously forwarded outgoing packets. If the corresponding bit is not set within at least one of the bitmaps, then the network node discards the corresponding packet. Finally, in order to maintain a relatively sparse bitmap, the entries are reset after detecting a clearance threshold event.

It is noted that the present invention has been incorporated into a network node (e.g., an intermediate network node) to block propagation of unsolicited (bogus) incoming packets transmitted by a rogue sender that potentially contaminate name/address resolution caches and/or ties up network resources through propagating and processing useless information. However, the present invention, based upon matching requests and responses through a mapping function and one or more bitmaps including set entries corresponding to mapped packet state values, is applicable to a variety of other services performed by an intermediate node within a network. For example, the matching-based filtering function is applicable to a data packet propagation/filtering method wherein a bank of intermediate nodes (e.g., firewalls) filter received response packets such that only the intermediate node that previously passed a request (as evidenced within the bitmap) will forward a subsequently received response.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

In accordance with an exemplary embodiment of the invention described herein below a method and network security component within a network node are disclosed that are potentially capable of detecting a large percentage of false (spoofed) responses. The security component includes a mapping (e.g., hash) function that renders, based upon state information contained within an outgoing (e.g., request, initial SYN, etc.) packet received by the network node, a mapped value between 0 and N−1 (e.g., 0 to $2^{20}-1$). The mapped value determines a position set in a bitmap comprising N entries. The set position thus corresponds to the outgoing packet. The illustrative embodiment also embodies a mechanism for clearing the bitmaps upon reaching a threshold event (e.g., a time period expires).

Furthermore, in an exemplary embodiment of the invention, the network security component also includes a current bitmap and a recent bitmap. Each bitmap contains N entries. Each time the security component calculates a mapping function value from state information provided within an outgoing packet (as well as a responsive incoming packet), a bitmap entry corresponding to the mapping function value is updated (e.g., set) within the current bitmap to reflect the outstanding request. In the exemplary embodiment, contents of the current bitmap are shifted from the current bitmap to the recent bitmap when a threshold event is detected (e.g., a period timer expires). The recent bitmap, by maintaining the state of the current bitmap for a full period, enables the current bitmap to be cleared periodically while ensuring that each set bitmap entry is represented within the incoming packet-filtering bitmaps for a period of time between threshold events.

When the network node receives an incoming (e.g., response, SYN-ACK, etc.) packet purportedly corresponding to a previously transmitted outgoing packet, the security component applies the mapping function on state information within the incoming packet. If the incoming packet information corresponds to a previously forwarded outgoing packet forwarded through the network node, then applying the mapping function to state information in the incoming packet will render a value corresponding to a previously set entry in either the current or recent bitmaps—assuming the response was not too delayed and the corresponding set bit has been cleared from the bitmaps. Thus, if the security component determines that the incoming packet mapping (e.g., hash) function value corresponds to a set bit in one of the incoming packet filtering bitmaps, then the packet is processed. Otherwise, if a corresponding bit is not set in the packet filtering bitmaps, then the incoming packet is discarded.

The security component operates in association with other components executed upon the network node, such as name/address resolution caches and packet forwarding functions mentioned above. These additional components are merely illustrative examples of applications whose performance potentially benefits from the protections provided by the security component disclosed by way of example herein below with reference to the drawings.

By way of example, in the context of a node including a PNRP client, if a bitmap entry match is identified for a mapping (e.g., hash) function value for state information in a name resolution response packet within either the current or recent bitmaps, then the response is likely a valid response to a previously issued name resolution request. Therefore, the node processes the received packet. Such processing includes at least forwarding the packet. In an embodiment of the invention, if the intermediate node itself maintains a name resolution cache, then further processing is performed to potentially add the name resolution information contained within the response packet to a name/address cache maintained by the intermediate node. If the mapping function value for the response packet state information does not match a set entry in the bitmaps, then the response is unreliable (either the response exceeded an expected response time or is a spoofed response intended to corrupt the intermediate node's name/address cache), and the suspect packet is discarded.

Success of the security measures summarized above is highly reliant upon a spoofed response packet mapping function value, in a high percentage of instances, not corresponding to a set bit within the bitmaps representing a request packet previously forwarded by the intermediate node. Inevitably, over a period of time the current bitmap becomes more populated with set bits corresponding to request packets forwarded by the node. The probability of a mapping function value for a spoofed packet matching a set bit in the bitmaps increases as the percentage of set bits within the bitmaps increases. To ensure that the bitmap remains relatively sparse (and render spoofing more difficult), after a period of time the contents of the current bitmap are cleared. This period of time is a value selected according to potentially a number of factors including, for example, the level of traffic through the node, the degree of certainty desired that a spoofed response will be detected, and the range and frequency for various delay times for a node receiving incoming packets in response to previously forwarded outgoing requests.

Finally, the bitmap entry corresponding to an outgoing packet processed just before the end of a period for clearing the current bitmap is cleared from the current bitmap without offering a reasonable time for receiving a response. A legitimate incoming response packet is likely to be rejected since the current bitmap entry was cleared after the node forwarded the outgoing packet. In an embodiment of the invention, to ensure that all outgoing packets are represented in the mapping function bitmaps for at least a particular minimum time (e.g., the refresh period of the current bitmap), the recent bitmap acquires the content of the current bitmap in association with clearing the current bit map at the end of a period.

Although not required, in an embodiment of the present invention a computer implements the above-summarized functionality by executing software instructions, such as program modules. Generally, program modules include routines, objects, components, data structures and the like that facilitate performing particular tasks or implementing particular abstract data types. The term "program" includes one or more program modules. It is also noted that the functions performed in accordance with the present invention, by virtue of their relative simplicity, are also suitable for implementation in software, firmware and/or hardware (exclusively, or in any combination thereof).

Figure 1:
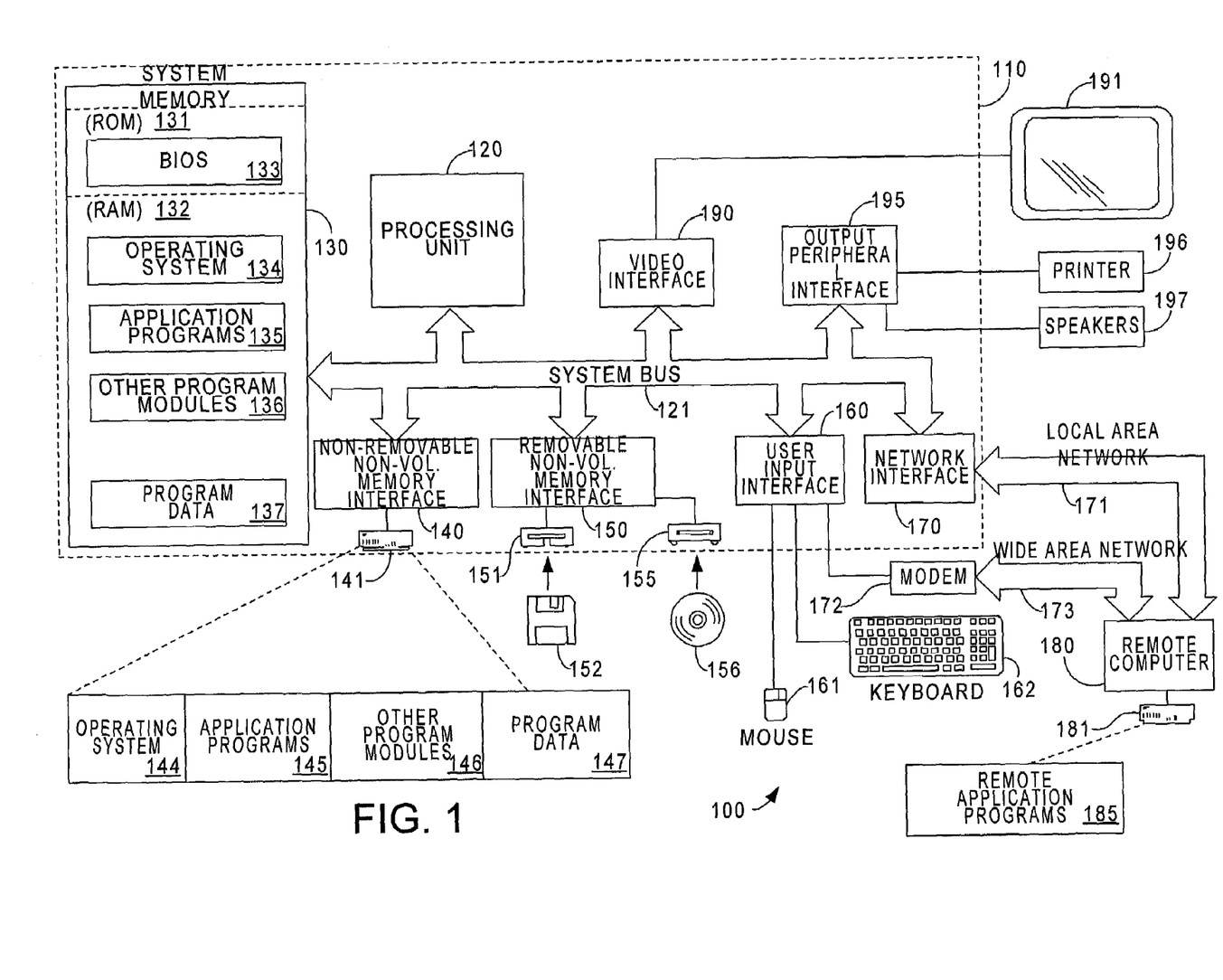
FIG. 1 is a simplified schematic illustrating a computing device architecture of a computing device upon which embodiments of the invention may be executed.

With reference to FIG. 1, an exemplary system for implementing the functionality of an intermediate node includes a computing device, such as computer 110. In the exemplary system, the invention is carried out in software executed upon the computer 110. However, the present invention is amenable to alternative designs wherein its functionality is carried out as a combination of hardware, firmware, and/or software on computing devices having varying degrees of computing/communications resources.

FIG. 1 illustratively depicts an example of a suitable operating environment 100 within which the invention is implemented. More particularly, FIG. 1 illustratively depicts a computer system capable of incorporating and executing the functionality of the request/response packet matching method and security component described, by way of example, in detail herein below.

The operating environment 100 is only one example of a suitable operating environment and is not intended to suggest any limitation as to the scope of use or functionality of the invention. The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
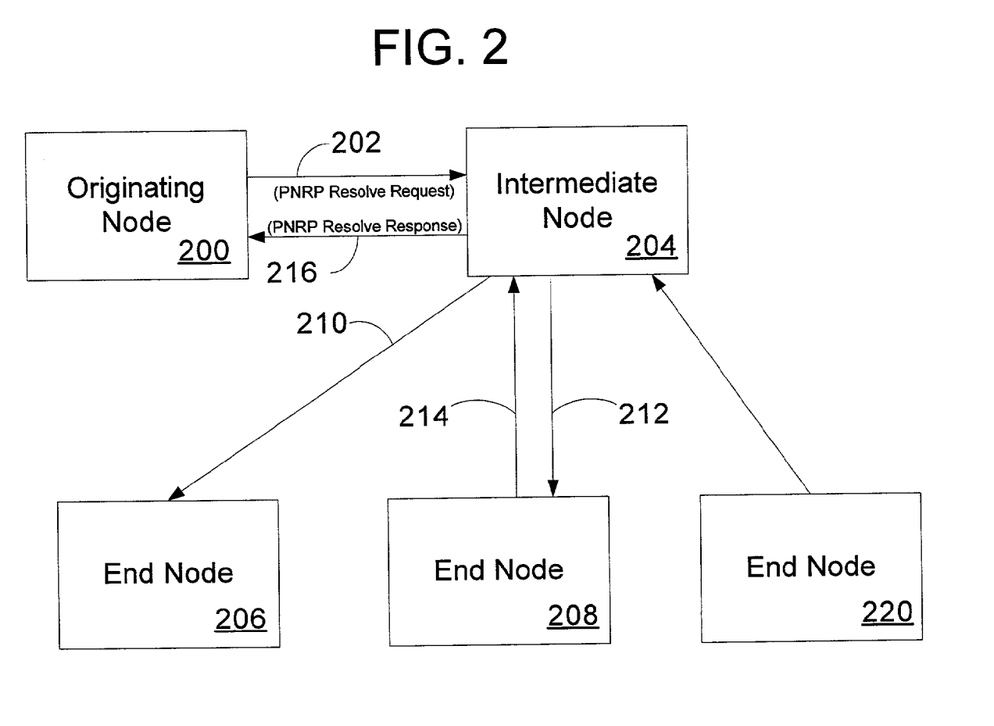
FIG. 2 is a diagram of an exemplary portion of a network environment in which the invention is employed.

FIG. 2 schematically depicts an exemplary network in which an embodiment of the invention is deployed. Since the present invention is not related to any particular physical network topology, the links between the network nodes represent messages, comprising one or more packets, passing between the nodes.

In the particular example, an originating node 200 passes a PNRP network name resolution request packet via message 202 to an intermediate node 204. The intermediate node 204, determines that message 202 is an outgoing packet (one for which a response is expected). In an embodiment of the invention, the intermediate node 204 processes the outgoing packet by: (1) applying a hash (or other suitable mapping) function to state information contained within the outgoing packet to render a hash (mapping function) value, and then (2) setting a bit within a bitmap corresponding to the hash (mapping function) value in accordance with a packet matching method for ensuring that only legitimate responses are passed back to a requesting node (e.g., originating node 200). The intermediate node 204 forwards the received PNRP network name resolution request to end node 206 and end node 208 via messages 210 and 212, respectively. The messages 210 and 212 comprise packets including the state information from message 202. It is noted that, in the illustrative embodiment described herein, a hash function is utilized to establish a value representing a particular packet. However, the present invention contemplates applying a wide variety of mapping functions (including hashing) to the packet in accordance with alternative embodiments.

End node 206 does not possess a name resolution cache and therefore ignores the forwarded message 210. However, end node 208 does indeed possess a name cache that includes the requested name/address resolution information. The end node 208 issues a name resolution response packet and includes it within a response message 214 directed to the intermediate node 204. The response message 214, in addition to providing the requested address information corresponding to the name identified in the original request from node 200, also includes the state information from the message 202 and replicated in forwarded message 212.

Upon receiving the message 214, the intermediate node 204 extracts the state information within an incoming packet associated with the message 214. The intermediate node 204 performs the hashing function on the state information and checks to see that a position within a bitmap, comprising a set of bit positions set when outgoing messages are handled by the intermediate node, is set to ensure that the message 214 corresponds to a previous naming request. In accordance with an embodiment of the present invention, upon verifying that a corresponding bitmap position is indeed set, the intermediate node 204 passes a PNRP resolve response message 216 to the originating node 200. Furthermore, since the intermediate node 204 includes a PNRP name resolution cache, the intermediate node 204 adds the name resolution information provided by the incoming packet of message 214 to its name resolution information.

While a legitimate request/response sequence has been described, there exists a risk that a node (e.g., end node 220) operating on the network will commence issuing a stream of false name resolution responses in an attempt to contaminate the name cache of intermediate nodes, such as intermediate node 204, that are listening to such responses in an effort to build their collection of ID/network address information.

It noted in closing that the example set forth in FIG. 2 is merely exemplary, as those skilled in the art will readily appreciate the wide variety of different network environments, and network nodes within which the disclosed packet matching method is carried out in accordance with alternative embodiments of the invention.

Figure 3:
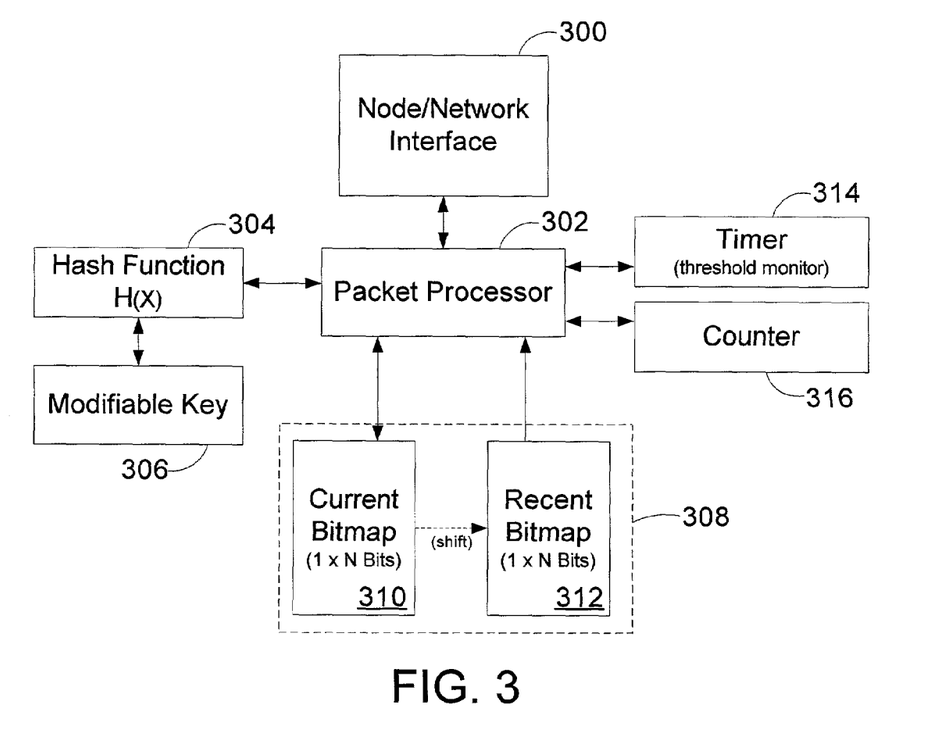
FIG. 3 is a schematic diagram depicting primary functional components of an intermediate network node incorporating security measures embodying the present invention.

Having provided an exemplary network environment suitable for carrying out the present invention, attention is now directed to FIG. 3 that schematically depicts the functional/structural components within an exemplary intermediate node, such as node 204 of FIG. 2, incorporating the packet filtering method disclosed herein. These functional components, by way of example, carried out by data structures and executable software instructions on a computing device. However, the disclosed functional components are alternatively carried out by firmware or hardware—or a combination thereof.

With reference now to FIG. 3, the intermediate node 204, includes a network interface 300 through which node 204 communicates with other nodes on a network. The network interface 300 facilitates receiving and forwarding incoming and outgoing packets. The wide spectrum of varying physical and functional capabilities of such interfaces are known to those skilled in the art. The network interface 300, forwards received packets to a packet processor 302.

The packet processor 302 provides a security component through the application of a packet filtering operation. The packet filtering operation is based upon hashing state information in received packets (both outgoing and incoming) and then using the rendered hash values to set corresponding bits within a current bitmap 310. The packet processor 302 carries out the hashing operation by reference to a hash function 304. In an embodiment of the invention, the hash function 304 is augmented by a modifiable key 306. Thus, even if the hashing function is known, discovery of the complete hashing operation is thwarted by modifying the key 306 value. In an embodiment of the invention, the value of the key 306 is used for all the packet filter bitmaps (e.g., current bitmap 310 and recent bitmap 312). In the case of a single key value, the packet processor 302 clears all entries in all the bitmaps (not just the current bitmap) when the key value changes. Such key change will thus create the potential for improperly rejected incoming packets. However, the impact of such rejected incoming packets is negated by applying key changes at times when the current bitmap 310 has few, or no, set bits.

Alternatively, a set of keys are provided. One key 306 is specified for each bitmap. The key values are relatively stable, thus relatively soon after a key change, all the key values will become equal. However, each time a key value changes, the values specified for the bitmap keys differs until the key value change propagates through the shifting stages of the bitmaps. In the illustrative embodiment, a set of bitmaps 308 maintained and accessed by the packet processor 302 consists of the current bitmap 310 and a recent bitmap 312. In this instance, the key change propagates to both after a single shift of contents from the current bitmap 310 to the recent bitmap 312 upon detection of a clearance threshold event.

There are a number of different ways in which the packet processor 302 executes a shift operation (and clears the current bitmap 310). For example, the contents of the current bitmap 310 can be physically transferred to the recent bitmap 312 during a shift operation, and each entry within the current bitmap 310 is thereafter cleared. Another way to accomplish the shift is to merely re-assign memory designations by modifying pointers maintained for the current bitmap 310 and the recent bitmap. In the embodiment relying upon pointers to the bitmaps, shifting the contents of the current bitmap 310 to the recent bitmap 312 is carried out by loading the address for the current bitmap 310 into the address (pointer) specifying the location of the recent pointer 312. The packet processor 302 reassigns the pointer to the current bitmap 310 to a cleared bitmap memory space. Each bitmap is sufficiently large to provide at least one bit position for each potential value rendered by the hash function. The bitmap size is dynamically re-sizeable based upon operating conditions detected by the packet processor (e.g., high/low traffic volume) in a manner, described by way of example, described herein below. Finally, it is noted that the packet processor 302 only sets bits within the current bitmap 310. The only time contents of the recent bitmap 312 are modified is at the above-described shift operation when the entire contents of the current bitmap are acquired by the recent bitmap 312.

The packet processor 302 performs a threshold detection role associated with the above-mentioned shift stages of the bitmaps. The present invention contemplates a variety of possible threshold measures (e.g., a timer, a received packet counter, etc.). In the illustrative embodiment, the packet processor 302 includes a period timer 314. When the period measured by the timer 314 expires, the packet processor 302 executes the above-mentioned bitmap shift and clear operation. The threshold detection role of the processor ensures that the bitmaps remain relatively sparse—thereby enhancing the ability of the packet processor to detect improper packets.

The packet processor 302 operates in a variety of network environments having a wide spectrum of packet traffic volumes. Even a same node containing the packet processor 302 is subject to a wide range of traffic volume levels over the course of even a single day. The packet processor 302 includes a capability to dynamically re-size the bitmaps 310 and 312 according to detected volume levels and thus maintain relatively sparse bitmaps. With continued reference to FIG. 3, the packet processor 302 maintains a counter 316 to indicate the level of packet traffic handled by the packet processor 302. Furthermore, in an embodiment of the invention, the packet processor 302 resets the counter 316 upon expiration of the period timer 314.

The counter 316's count value (readable at any time, and not merely at the time the timer 314 period expires) assists in determining when, and whether, to re-size the current bitmap 310. In a particular embodiment of the present invention, re-sizing is performed by the packet processor 302 based upon designated count thresholds for the counter 316 in a time period. If the packet processor 302 registers a high received packet count within the counter 316, then the packet processor 302 expands the size of the current bitmap 310 according to the designated count thresholds to maintain a desired level of non-set positions to ensure that improper incoming packets are detectable to a high degree of certainty. The packet processor 302 also modifies the hash function to reflect the increased range of hash values represented within the current bitmap 310. For example, when the current bitmap 310 size is doubled, an additional bit is added to the hash function output values to reflect the increased range. The recent bitmap 312 is resized when the contents of the current bitmap 310 are shifted to the recent bitmap 312. Conversely, during periods of lowered packet traffic, the packet processor 302 reduces the size of the current bitmap 310, and makes changes to the hash function 304 according to the reduced range of potential hash values.

In an alternative embodiment of the invention, rather than modifying the bitmap size in response to changed levels of crowding in the bitmaps, the time period measured by timer 314 is modified. In yet another embodiment, over-populating the bitmaps is avoided by maintaining a counter identifying the quantity of set bits within a bitmap and clearing the current bitmap when the counter reaches a triggering threshold. Yet other embodiments include hybrid threshold policies incorporating combinations the above described methods for ensuring sparse bitmaps.

Figure 4:
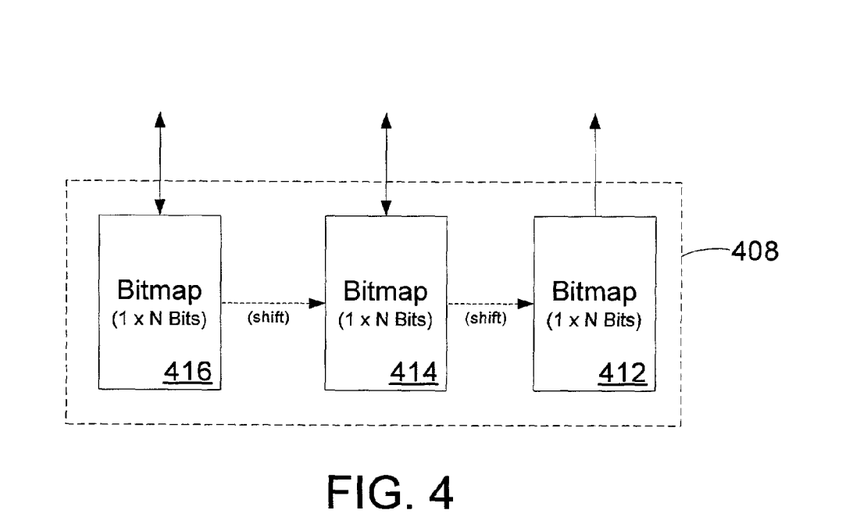
FIG. 4 is a schematic diagram of an alternative bitmap arrangement supporting a designated variable delay.

Having described an exemplary packet handling infrastructure, attention is directed to FIG. 4 that depicts an alternative bitmap arrangement that facilitates a variable range of delays before a set entry is ultimately shifted out of the bitmaps. In particular, a set of three bitmaps are depicted. Bitmap 412 corresponds, in terms of functionality, to recent bitmap 312. Bitmap 412 receives the contents of bitmap 414, and bitmap 414 receives the contents of bitmap 416 upon detecting a clearance threshold. The packet processor 302 sets bits within either bitmap 414 or 416 based upon a configurable delay selection scheme. Bitmap 414 acquires the contents of bitmap 416 after a first threshold event, and therefore the contents of bitmap 416 stay within the bitmaps 408 for one more time threshold period than bits set within bitmap 414. In an embodiment of the invention, the packet processor 302, by default, sets a bit corresponding to an outgoing packet within bitmap 414. However, specially designated outgoing packets will be allowed to remain in the bitmaps 408 for an additional threshold detection. It is noted that the multiple time delay architecture is extendable to any desired number of bitmaps to accommodate a need to provide longer delays for some outgoing packets.

In yet another embodiment of the invention, rather than allocating a single bit to each position, multiple bits are allocated for each bitmap position to operate as a counter. In an embodiment wherein each bitmap position comprises two bits, the potential values are zero, one, two, and "three or more." In such an embodiment, setting an appropriate position within a bitmap comprises incrementing the counter unless it has reached its maximum count value (e.g., for a two-bit counter, the maximum count is three). When an incoming packet is received, the corresponding counter is decremented, assuming that it's value is not zero or the maximum counter value—in that case the counter is left alone.

In an embodiment of the counter-based approach that includes a current bitmap and recent bitmap, only the current bitmap counters are incremented when outgoing packets are handled. When an incoming (response) packet is received, the appropriate counter in the recent bitmap is decremented first. If, for an incoming packet, the counter in the recent bitmap equals zero, then the current bitmap is accessed (and decremented—if possible). If the bitmap position corresponding to the incoming packet equals zero in each of the bitmaps, then the incoming packet is discarded. Furthermore, if a counter equals the maximum (e.g., three or more), the counter is not decremented when an incoming packet mapping function (e.g., hash) value references the position. The above-proposed scheme for handling requests and responses in a system including multiple bits at each bit position and multiple bitmaps is exemplary. Other counter increment/decrement/reset schemes are contemplated in accordance with various embodiments of the invention.

Yet other variations of the above-described bitmap structures/handling schemes are contemplated as well, such as using a single bitmap including multi-bit counters that are periodically decremented and/or reset to account for requests that have not recently received a corresponding response (and counters that have reached their maximum).

Figure 5:
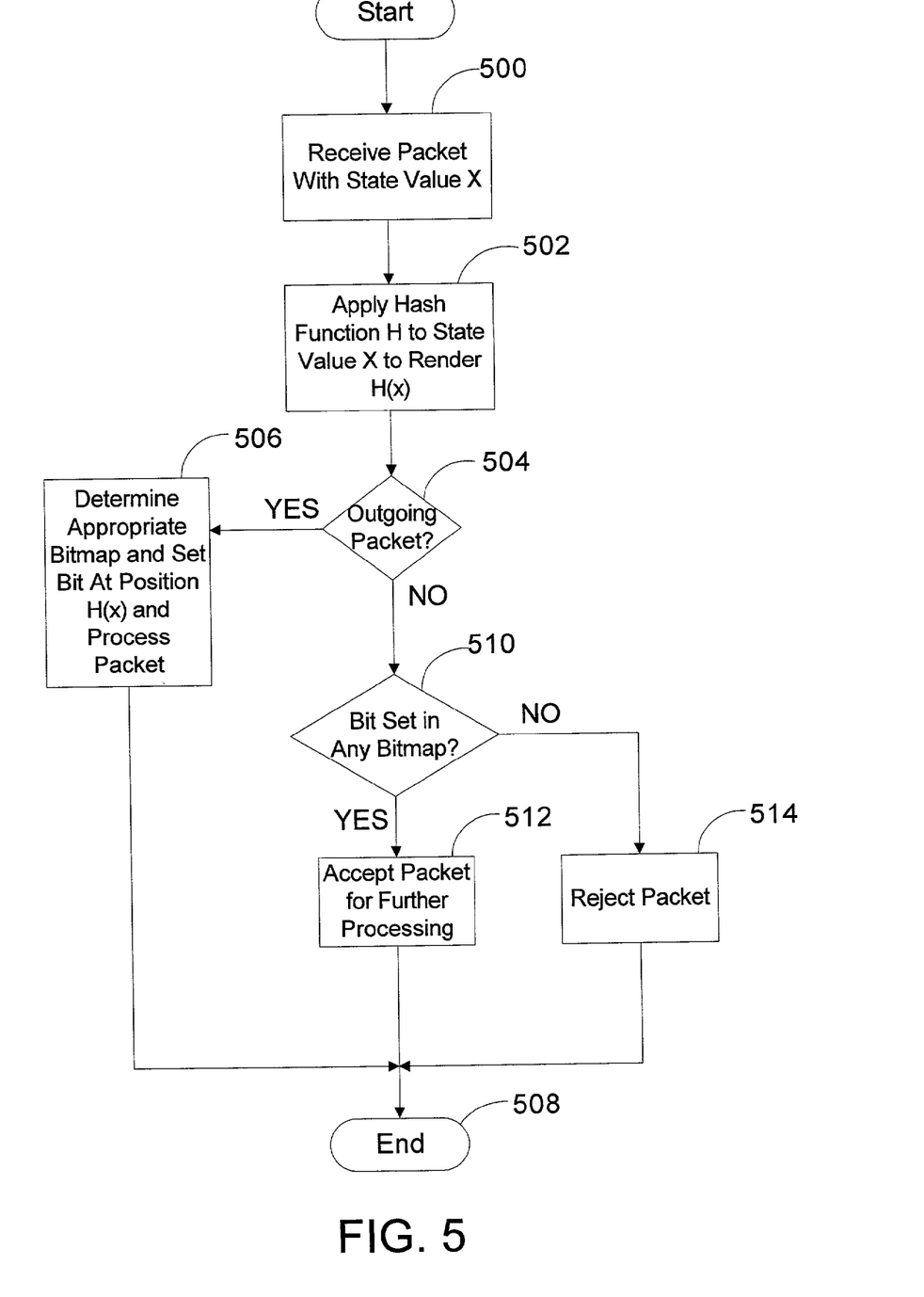
FIG. 5 is a flowchart summarizing the packet matching function performed by a network node in accordance with an embodiment of the present invention.

Having described an infrastructure for handling outgoing and incoming packets in accordance with an embodiment of the present invention, attention is now directed to FIG. 5, that summarizes steps performed by the packet processor 302 in response to receiving a packet. In this embodiment, the packet processor 302 maintains only one key (applied to all bitmaps). During step 500, the packet processor 302 receives a packet that is either an outgoing packet associated with some initial message or an incoming packet associated with a reply to an initial message previously forwarded by the network node upon which the packet processor resides. Both outgoing and incoming packets are associated with a set of state information stored, by way of example, as a sequence of binary values representable as a single unsigned number "X." In the above-mentioned example of a PNRP packet, the state value of interest is a 256-bit value that a PNRP RESOLVE message seeks to resolve. Alternatively, in a packet-filtering firewall example, the value X is a 96-bit number consisting of two 32-bit IPv4 addresses and two 16-bit TCP or UDP port numbers.

During step 502, the packet processor 302 applies a hash function, including the key 306, to the value X within the received packet to render a hash value H(x). As used herein, the term hash function is to be interpreted very broadly to include a wide variety of logical/mathematical operations performed upon the state value X. In an embodiment of the invention, the hash function is selected such that its application to state information for a large number of packet states results in a fairly even distribution of outcome probabilities. The even distribution prevents subjecting particular entries to frequent collisions (i.e., two different messages hash to a same value during a period measured by the timer 314). Also, the hash function is varied by periodically modifying the key 306 value, thereby rendering the hash function output less predictable (i.e., an attacker cannot identify likely values for H(x)).

The packet processor 302 treats outgoing packets in a different manner from incoming packets. Outgoing packets (e.g., PNRP RESOLVE, or initial TCP packet with a SYN flag set) are always forwarded. On the other hand incoming packets are tested and discarded if they do not meet a filtering policy enforced by the packet processor. Therefore, during step 504 the packet processor 302 determines whether the packet is outgoing or incoming, and branches accordingly. If, at step 504, the packet is an outgoing packet, then control passes to step 506 wherein the packet processor 302 determines an appropriate bitmap and sets a bit at a position corresponding to the hash value H(x) rendered during step 502. In the case of the packet filtering system depicted in FIG. 3, a bit at a position corresponding to H(x) is set in the current bitmap 310. Alternatively, a bit is set in either bitmap 414 or bitmap 416 based upon the desired delay in the embodiment of the bitmaps depicted in FIG. 4. In an embodiment of the invention, the bitmaps are sized to accommodate the range of values rendered by H(x). As previously mentioned, in an embodiment of the invention, selecting the range of values of H(x) supported by the bitmaps is based upon a number of packets received by the network node during a period measured by the timer 314. The present invention is based upon probabilities, and thus the range of values also depends upon an acceptable level of chance that an illegitimate incoming packet will not be detected.

After setting the appropriate bit within a bitmap during step 506, the outgoing packet is processed in its normal manner (e.g., the packet is forwarded to another network node). Control then passes to the End 508.

If, at step 504, the received packet is an incoming packet (e.g., a PNRP RESOLVE response or non-initial TCP packet), then control passes to step 510. At step 510 the packet processor examines the bit position within one or more of the bitmaps (e.g., current bitmap 310 and/or recent bitmap 312) corresponding to the value H(x) rendered during step 502. If at least one of the corresponding bitmap positions is set, then the incoming packet is considered legitimate, then control then passes to step 512. At step 512 the packet processor 302 accepts the packet for further processing. Such further processing includes, by way of example, forwarding the received incoming packet to other network nodes and updating a name resolution cache to include the name resolution address information contained within the incoming packet. Control then passes to the End 508.

If, at step 510, the packet processor 302 determines that the bitmap positions corresponding to the value H(x) in the bitmaps (e.g., current bitmap 310 and recent bitmap 312) are not set, then the incoming packet is considered illegitimate. Control thereafter passes to step 514 wherein further processing of the packet includes at least registering a rejection of the packet. In an embodiment of the invention, rejected packets are discarded by the network node upon which the packet processor 302 resides. Additional operations performed for a rejected packet include maintaining a count of rejected packets to identify a high rejection count. The high rejection count in turn activates an alarm or other responsive action to a threat to the network's proper operation.

An embodiment of the present invention includes a bitmap clearing function. Such clearing is desired, in the case of the system depicted in FIGS. 3 and 4 to ensure that the bitmaps remain sparse. As mentioned herein above, there are a number of ways to trigger such a clearing by specifying and testing for particular threshold events. In a particular embodiment of the present invention, the threshold is reached when a period measured by a period timer (e.g., timer 316) expires. Alternatively, a threshold (triggering) event is reached when a counter value representing, for example, the number of bits set within current bitmap 310 exceeds a specified value.

Figure 6:
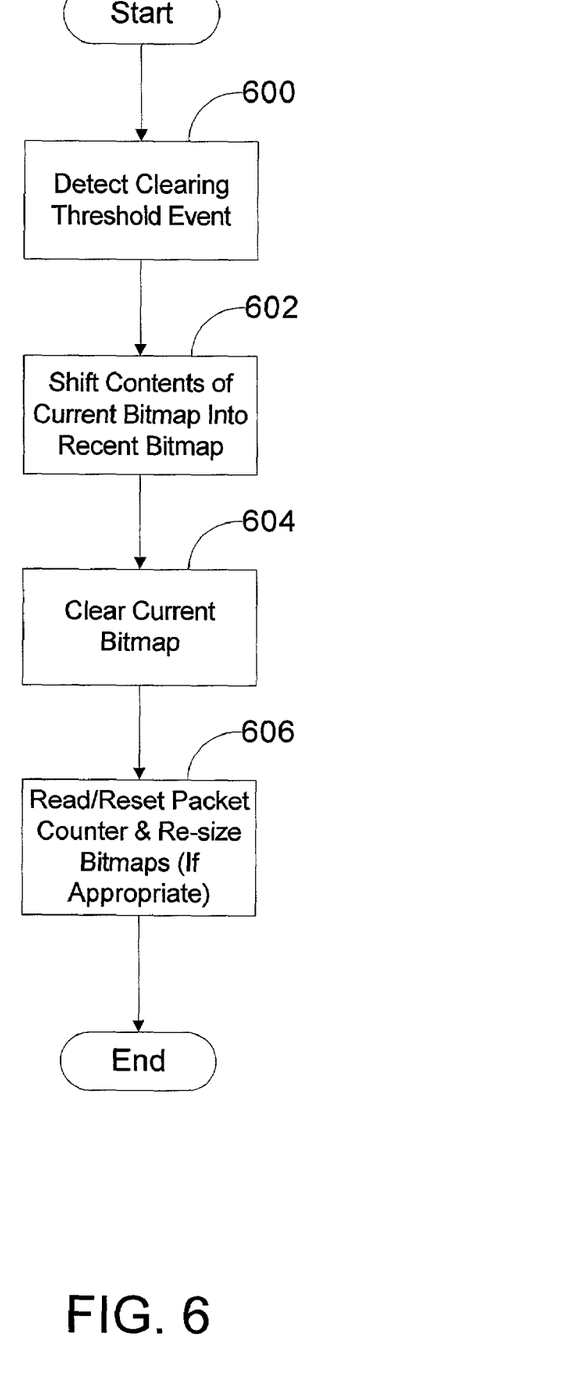
FIG. 6 is a flowchart summarizing the steps for maintaining relatively sparse bitmap structures for carrying out the matching functionality in accordance with an embodiment of the present invention.

With reference to FIG. 6, in response to detecting a threshold event at step 600 (e.g., after an elapsed time period "T"), control passes to step 602. At step 602 contents of the packet processor 302 commences executing the bitmap clearing operation. In the exemplary embodiment of the invention set forth in FIG. 3, the contents of the current bitmap 310 replace the contents of the recent bitmap 312. Next, during step 604, the contents of the current bitmap 310 are cleared (e.g., set to zero).

Steps 602 and 604 are modified slightly in the case where multiple differing delays are available. In the alternative embodiment set forth in FIG. 4, bitmap 412 receives the contents of bitmap 414 and bitmap 414 receives the contents of bitmap 416. Then bitmap 416 is cleared. Furthermore, replacing the contents of a bitmap is achievable by re-assigning a pointer to a bitmap location rather than by physically copying contents.

In an embodiment of the invention, after performing the bitmap updates the packet processor 302 reads (and then resets) the counter 316 value at step 606. Thereafter, the packet processor 302 determines, in view of a re-sizing policy taking into consideration the current size of the current bitmap 310 and the counter 316 value, whether to re-size (contract or enlarge) the current bitmap 310. If the current bitmap is re-sized, then the hash function is also modified to render a range of output values corresponding to the new bitmap size.

It will be appreciated by those skilled in the art that a new and useful method and computational infrastructure for matching responses to requests by a packet processor in a network node has been described herein. In view of the many possible network/system arrangements to which the principles of this invention may be applied, however, it should be recognized that the embodiments described herein with respect to the drawing figures are meant to be illustrative and should not be taken as limiting the scope of invention.

Those skilled in the art to which the present invention applies will appreciate that the illustrated embodiments can be modified in arrangement and detail without departing from the spirit of the invention. For example, the invention is described with regard to executing packet processing software upon a network node and allocating memory to accommodate a set of bitmaps facilitating detecting illegitimate incoming packets in a network node. Embodiments of the invention are described in terms of software modules and/or functional components. However, those skilled in the art will recognize that the disclosed functionality may be equivalently replaced by hardware/firmware components. Therefore, the invention as described herein contemplates all such embodiments as may come within the scope of the following claims and equivalents thereof.

What is claimed is:

1. A method for ensuring that a received response message corresponds to a previously forwarded request message on a network node including a mapping function, the method comprising the steps of:

at the network node, receiving an outgoing packet for which a response is expected, the outgoing packet including state information comprising a first set of data bit values;

first mapping, by the mapping function, the first set of data bit values to render a first mapped data value;

setting an entry within a bitmap at a position corresponding to the first mapped data value, the bitmap residing at the network node;

forwarding the outgoing packet to an end node, the end node comprising a name resolution cache;

at the network node, receiving an incoming packet from the end node, the incoming packet including state information comprising a second set of data bit values, the second set of data bit values corresponding to the first set of data bit values;

wherein the incoming packet is a response to the outgoing packet;

second mapping, by the mapping function, the second set of data bit values to render a second mapped data value;

testing an entry within one or more bitmaps;

wherein the one or more bitmaps include positions set in accordance with the setting step, the positions corresponding to the second mapped data value;

establishing a match between the first mapped data value and the second mapped data value with a mapping function value rendered from state information for a previous request packet; and performing at least one function upon the incoming packet based upon whether the match is established during the testing step.

2. The method of claim 1 further comprising the step of:
resetting at least a portion of the contents of at least one bitmap, having entries set in accordance with the setting step, upon detecting a clearance threshold event.

3. The method of claim 2 wherein the clearance threshold event comprises expiration of a time period.

4. The method of claim 2 wherein the network node includes at least a first bitmap having entries set during the setting step, and a second bitmap, and wherein the method comprises the further step of:
replacing contents of the second bitmap with contents of the first bitmap upon detecting the clearance threshold event.

5. The method of claim 4 wherein the testing step comprises testing entries in both an entry in the first bitmap and the second bitmap corresponding to the second mapped data value and wherein the match is established, for application during the performing step, if at least one of the corresponding entries in the first bitmap or the second bitmap is set.

6. The method of claim 1 further comprising changing a key incorporated into the mapping function.

7. The method of claim 1 further comprising:
monitoring a level of packets received during a time period; and
modifying, based upon the level of packets received during the time period, at least a size of the bitmap having entries set during the setting step.

8. The method of claim 2 wherein the network node comprises a set of at least three bitmaps arranged as shift registers wherein contents of the first bitmap are shifted into corresponding positions within a second bitmap and contents of the second bitmap are shifted into a third bitmap upon detecting the threshold event, and wherein the method further comprises:
applying a classification rule to a received request to determine which of the set of at least three bitmaps to have a bit set in accordance with the first mapping step, thereby facilitating varying a delay period before a set bit is cleared from the set of at least three bitmaps.

9. The method of claim 1 wherein the incoming packet is a naming request.

10. The method of claim 9 wherein the naming request is a peer-to-peer name resolution protocol request.

11. The method of claim 1 wherein the setting step comprises conditionally incrementing a multi-bit entry within the bitmap.

12. The method of claim 1 wherein the mapping function comprises a hashing operation.

13. A tangible computer-readable medium having computer-executable instructions for ensuring that a received response message corresponds to a previously forwarded request message on a network node including a mapping function, the tangible computer-readable medium having computer-executable instructions facilitating performing the steps of:
receiving an outgoing packet for which a response is expected, the outgoing packet including state information comprising a first set of data bit values;
first mapping, by the mapping function, the first set of data bit values to render a first mapped data value;
setting an entry within a bitmap at a position corresponding to the first mapped data value;
receiving an incoming packet including state information comprising a second set of data bit values, the second set of data bit values corresponding to the first set of data bit values;
wherein the incoming packet is a response to the outgoing packet;
second mapping, by the mapping function, the second set of data bit values to render a second mapped data value;
testing an entry within one or more bitmaps;
wherein the one or more bitmaps include positions set in accordance with the setting step, the positions corresponding to the second mapped data value;
establishing a match between the first mapped data value and the second mapped data value with a mapping function value rendered from state information for a previous request packet; and
performing at least one function upon the incoming packet based upon whether the match is established during the testing step.

14. The tangible computer-readable medium of claim 13 further comprising computer-executable instructions facilitating performing the step of:
resetting at least a portion of the contents of at least one bitmap, having entries set in accordance with the setting step, upon detecting a clearance threshold event.

15. The tangible computer-readable medium of claim 14 wherein the clearance threshold event comprises expiration of a time period.

16. The tangible computer-readable medium of claim 14 wherein the network node includes at least a first bitmap having entries set during the setting step, and a second bitmap, and wherein the method comprises the further step of:
replacing contents of the second bitmap with contents of the first bitmap upon detecting the clearance threshold event.

17. The tangible computer-readable medium of claim 16 wherein the testing step comprises testing entries in both an entry in the first bitmap and the second bitmap corresponding to the second mapped data value and wherein the match is established, for application during the performing step, if at least one of the corresponding entries in the first bitmap or the second bitmap is set.

18. The tangible computer-readable medium of claim 13 further comprising changing a key incorporated into the mapping function.

19. The tangible computer-readable medium of claim 13 further comprising:
monitoring a level of packets received during a time period; and
modifying, based upon the level of packets received during the time period, at least a size of the bitmap having entries set during the setting step.

20. The tangible computer-readable medium of claim 14 wherein the network node comprises a set of at least three bitmaps arranged as shift registers wherein contents of the first bitmap are shifted into corresponding positions within a second bitmap and contents of the second bitmap are shifted into a third bitmap upon detecting the threshold event, and wherein the method further comprises:
applying a classification rule to a received request to determine which of the set of at least three bitmaps to have a bit set in accordance with the first mapping step, thereby facilitating varying a delay period before a set bit is cleared from the set of at least three bitmaps.

21. The tangible computer-readable medium of claim 13 wherein the incoming packet is a naming request.

22. The tangible computer-readable medium of claim 21 wherein the naming request is a peer-to-peer name resolution protocol request.

23. The tangible computer-readable medium of claim 13 wherein the setting step comprises conditionally incrementing a multi-bit entry within the bitmap.

24. The tangible computer-readable medium of claim 13 wherein the mapping function comprises a hashing operation.

25. A system for packet handling within a network node including a network interface for receiving and forwarding outgoing packets and corresponding incoming packets between network entities comprising:
a mapping function;
at least one bitmap residing at the node; and
a received packet processor including executable instructions for:
receiving an outgoing packet for which a response is expected, the outgoing packet including state information comprising a first set of data bit values;
first mapping, by the mapping function, the first set of data bit values to render a first mapped data value;
setting an entry within the at least one bitmap at a position corresponding to the first mapped data value;
receiving an incoming packet including state information comprising a second set of data bit values, the second set of data bit values being of a type corresponding to the first set of data bit values;
wherein the incoming packet is a response to the outgoing packet;
second mapping, by the mapping function, the second set of data bit values to render a second mapped data value;
testing an entry within one or more bitmaps;
wherein the one or more bitmaps include positions set in accordance with the setting step, the positions corresponding to the second mapped data value;
establishing a match with a mapping function value rendered from state information for a previous request packet, the match between the first mapped data value and the second mapped data value; and
performing at least one function upon the incoming packet based upon whether the match is established during the testing step.

26. The packet handling system of claim 25 wherein the received packet processor includes executable instructions for:
resetting at least a portion of the contents of at least one bitmap, having entries set in accordance with the setting step, upon detecting a clearance threshold event.

27. The packet handling system of claim 26 further comprising a period timer, and wherein the clearance threshold event comprises expiration of a time period measured by the period timer.

28. The packet handling system of claim 26 wherein the network node includes at least a first bitmap having entries set during the setting step, and a second bitmap, and wherein the received packet processor includes executable instructions for performing the further step of:
replacing contents of the second bitmap with contents of the first bitmap upon detecting the clearance threshold event.

29. The packet handling system of claim 28 wherein the testing step comprises testing entries in both an entry in the first bitmap and the second bitmap corresponding to the second mapped data value and wherein the match is established, for application during the performing step, if at least one of the corresponding entries in the first bitmap or the second bitmap is set.

30. The packet handling system of claim 25 further comprising a key generator for changing a key incorporated into the mapping function.

31. The packet handling system of claim 25 further comprising:
a packet counter for monitoring a level of packets received during a time period; and
modifying, based upon the level of packets received during the time period, a size of the at lest one bitmap.

32. The packet handling system of claim 26 wherein the at least one bitmap comprises a set of at least three bitmaps arranged as shift registers wherein contents of the first bitmap are shifted into corresponding positions within a second bitmap and contents of the second bitmap are shifted into a third bitmap upon detecting the threshold event, and wherein the received packet processor further comprises executable instructions for:
applying a classification rule to a received request to determine which of the set of at least three bitmaps to have a bit set in accordance with the first mapping step, thereby facilitating varying a delay period before a set bit is cleared from the set of at least three bitmaps.

33. The packet handling system of claim 25 wherein the incoming packet is a naming request.

34. The packet handling system of claim 33 wherein the naming request is a peer-to-peer name resolution protocol request.

35. The packet handling system of claim 25 wherein the setting step performed by the received packet processor comprises conditionally incrementing a multi-bit entry within the bitmap.

36. The packet handling system of claim 25 wherein the mapping function comprises a hashing operation.

* * * * *